US009798881B2

(12) United States Patent
Davidson et al.

(10) Patent No.: US 9,798,881 B2
(45) Date of Patent: Oct. 24, 2017

(54) DYNAMIC FEATURE ENHANCEMENT IN CLIENT SERVER APPLICATIONS AND HIGH VOLUME SERVER DEPLOYMENT WITH DYNAMIC APP STORE INTEGRATION

(71) Applicant: Intel Corporation, Santa Clara, CA (US)

(72) Inventors: Jason A Davidson, Albany, OR (US); Somnath Chakrabarti, Bangalore (IN); Neeru S Pahwa, Bangalore (IN); Micah K Bhakti, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 175 days.

(21) Appl. No.: 14/721,138

(22) Filed: May 26, 2015

(65) Prior Publication Data
US 2015/0254460 A1  Sep. 10, 2015

Related U.S. Application Data

(63) Continuation of application No. 13/556,899, filed on Jul. 24, 2012, now Pat. No. 9,069,637.
(Continued)

(51) Int. Cl.
*G06F 9/00* (2006.01)
*G06F 15/177* (2006.01)
(Continued)

(52) U.S. Cl.
CPC .............. *G06F 21/575* (2013.01); *G06F 8/62* (2013.01); *G06F 9/4416* (2013.01);
(Continued)

(58) Field of Classification Search
None
See application file for complete search history.

(56) References Cited

U.S. PATENT DOCUMENTS 7,493,654 B2  2/2009  Bantz et al.
8,060,074 B2  11/2011  Danford et al.
(Continued)

OTHER PUBLICATIONS

Office Action issued in U.S. Appl. No. 13/557,336, dated Dec. 4, 2013, 7 pages.
(Continued)

*Primary Examiner* — Nitin Patel
(74) *Attorney, Agent, or Firm* — Grossman, Tucker, Perreault & Pfleger, PLLC

(57) ABSTRACT

Generally, this disclosure provides methods and systems for dynamic feature enhancement in client server applications and for high volume server deployment with dynamic app store integration and further enable the delivery of a secure server in a pre-configured turnkey state through an automated process with increased efficiency tailored to mass production. The system may include a server application module configured to receive request packets from, and send response packets to, a web based client application, the packets comprising input data, output data and control commands associated with a feature; and a script engine module coupled to the server application module, the script engine module configured to identify a plug-in application on a remote server, download the plug-in application and execute the plug-in application under control of the server application module, wherein the plug-in application implements the feature.

10 Claims, 7 Drawing Sheets

Related U.S. Application Data

(60) Provisional application No. 61/511,410, filed on Jul. 25, 2011.

(51) Int. Cl.

| | | |
|---|---|---|
| *G06F 21/57* | (2013.01) | |
| *G06F 9/445* | (2006.01) | |
| *H04L 29/06* | (2006.01) | |
| *H04L 29/08* | (2006.01) | |
| *G06F 9/44* | (2006.01) | |
| *G06F 9/455* | (2006.01) | |

(52) U.S. Cl.
CPC ...... *G06F 9/44526* (2013.01); *G06F 9/45533* (2013.01); *H04L 67/34* (2013.01); *H04L 67/42* (2013.01)

(56) References Cited

U.S. PATENT DOCUMENTS

| | | | |
|---|---|---|---|
| 8,813,223 | B2 | 8/2014 | Chakrabarti et al. |
| 8,977,842 | B1* | 3/2015 | McCorkendale ....... G06F 21/53 380/285 |
| 2005/0246718 | A1* | 11/2005 | Erlingsson ............ G06F 9/4411 719/317 |
| 2008/0126792 | A1* | 5/2008 | Herington ........... G06F 9/45537 713/100 |
| 2009/0125901 | A1* | 5/2009 | Swanson ............ G06F 9/45558 718/1 |
| 2012/0124581 | A1 | 5/2012 | Nitta |

OTHER PUBLICATIONS

Notice of Allowance issued in U.S. Appl. No. 13/557,336, dated Jul. 14, 2014, 5 pages.

\* cited by examiner

DYNAMIC FEATURE ENHANCEMENT IN CLIENT SERVER APPLICATIONS AND HIGH VOLUME SERVER DEPLOYMENT WITH DYNAMIC APP STORE INTEGRATION

CROSS REFERENCE TO RELATED APPLICATIONS

This application is a divisional application from U.S. application Ser. No. 13/556,899 filed Jul. 24, 2012, which claims the benefit of U.S. Provisional Application No. 61/511,410 filed Jul. 25, 2011, both of which are incorporated by reference herein in their entirety.

FIELD

The present disclosure relates to client server applications, and more particularly, to dynamic feature enhancement in client server applications. The present disclosure also relates to high volume server deployment, and more particularly, to high volume server deployment with dynamic application (app) store integration.

BACKGROUND

Many computing systems are based on a client-server model and provide features and functionality through plug-in applications. Typically, when new software features become available, they are distributed as patches, upgrades or updates. These upgrades are generally installed through a relatively inefficient process that involves stopping the existing applications that may be executing on either the client or the server, performing the update, and then restarting the application. This process creates undesirable downtime and application unavailability.

Additionally, computing system manufacturers and/or distributors typically build and configure systems by cloning a disk or memory system that, upon boot up, will perform limited customizations. Generally, these systems must subsequently undergo more extensive customization and configuration at the customer site, including error-prone license key acquisition, rather than being ready to use "out of the box." This is particularly true with systems that employ a redundant array of independent disks (RAID), encrypted file systems and/or trusted boot or execution environments.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides methods and systems for dynamic feature enhancement in client server applications and for high volume server deployment with dynamic app store integration. These techniques enable the addition of new features in a client server software product through the use of script engines and application emulation without requiring an upgrade of client or server components or associated interruption of services. These techniques further enable the delivery of a secure server in a pre-configured turnkey state through an automated process with increased efficiency tailored to mass production. The automated process may also provide for the dynamic addition of services, including product keys, from an app store over the internet.

Figure 1:
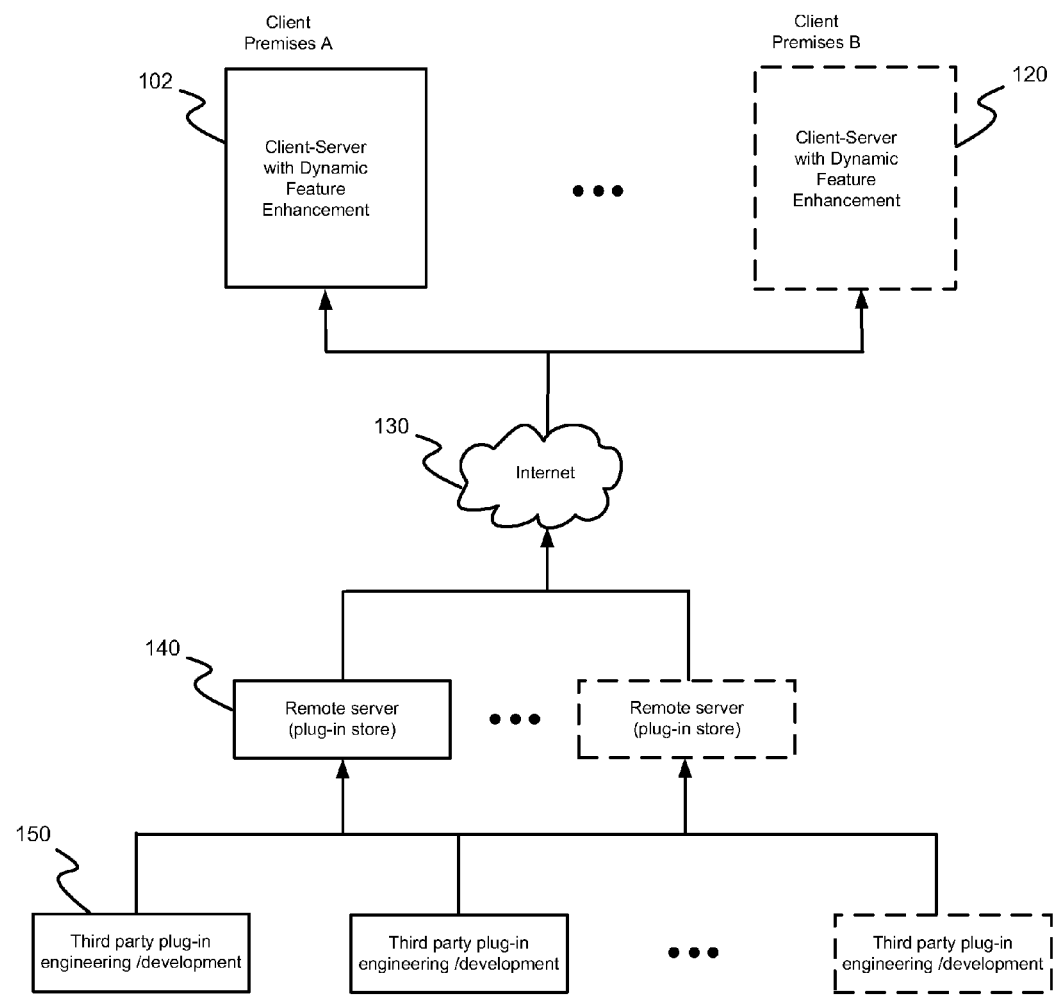
FIG. 1 illustrates a top-level block diagram of one exemplary embodiment consistent with the present disclosure.

FIG. 1 illustrates a top-level block diagram 100 of one exemplary embodiment consistent with the present disclosure. A number of client premises 102, 120 are connected to the internet 130. At each client premises 102, 120 there is a client-server with dynamic feature enhancement capability through the remote acquisition of binary or script applications (e.g., apps or plug-ins), as will be described in greater detail below. Remote servers (or plug-in stores) 140 may be available over the internet 130 to maintain a collection of updated plug-ins that may include the latest available features and functionality. The remote servers 140 may obtain these plug-ins from third party developers 150.

Figure 2:
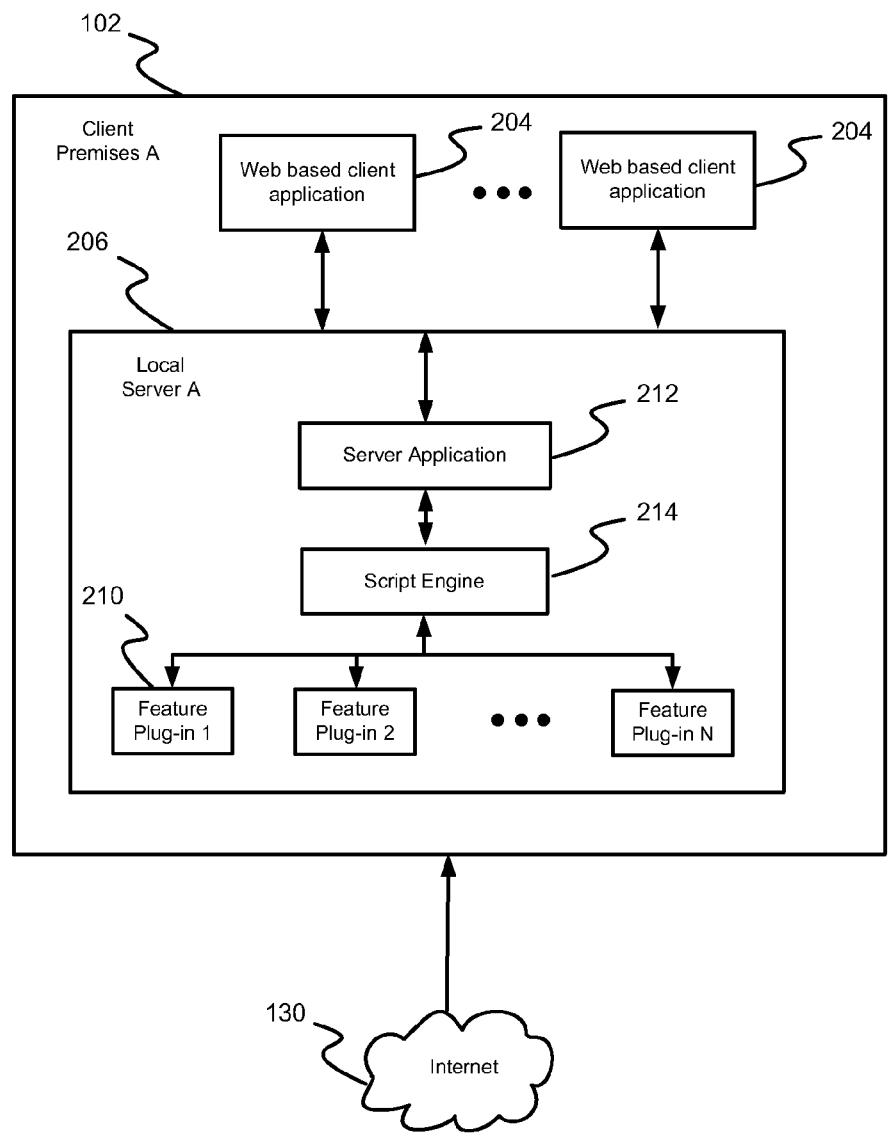
FIG. 2 illustrates a block diagram of one exemplary embodiment consistent with the present disclosure.

FIG. 2 illustrates a block diagram 200 of one exemplary embodiment consistent with the present disclosure. Details of the client-server system at client premises 102 are shown. At each client premises 102 there are a number of web based client applications 204 which may be run on one or more client computer systems. The web based client applications 204 are communicatively coupled to a server 206 which may be local to the client premises 102. Server 206 may host a server application 212, a script engine 214 and one or more feature plug-in components 210. Feature plug-in components 210 may be software modules that, when executed, perform particular functions and/or provide specific features that are requested by the web based client application 204.

Server application 212 acts as an interface between web based client application 204 and script engine 214. Server application 212 receives data from web based client application 204, where such data may represent input to one of the feature plug-in components 210. The input data may be wrapped in hypertext transfer protocol (HTTP) request packets. Server application 212 unwraps the input data and passes it to script engine 214, which determines the appropriate feature plug-in component 210 for processing of the input data and passes that data to the selected component. Similarly, when a feature plug-in component 210 produces output data, that data is passed back to server application 212, through script engine 214, where it may be wrapped in HTTP response packets and sent to the appropriate web based client application 204. In some embodiments, the HTTP response packets may be, for example, hypertext markup language (HTML) packets or extensible markup language (XML) packets. The web based client application 204 receives these packets and renders a response that emulates the feature plug-in component 210 that produced the output data.

Script engine 214 may also detect and identify the availability of new and/or updated plug-ins from remote servers (or plug-in stores) 140 over the internet 130. The remote servers 140 maintain a collection of updated plug-ins having the latest available features and functionality. The remote servers 140 may obtain these plug-ins from third party developers 150. Script engine 214 may be capable of dynamically loading and executing these plug-ins, which enable Server 206 at client premises 102 to provide the updated features and functionality to web based client applications 204 in a transparent manner, that is, without requiring a reload or restart of any client components or local server components.

Script engine 214 may be configured with information about the external interface of each feature plug-in component 210 which enables it to expose the plug-in 210 to the web based client application 204 without requiring changes to the web based client application 204.

In some embodiments, any suitable transfer protocol may be used as a substitute for HTTP, including proprietary protocols. Some examples of web based client applications include, but are not limited to, Adobe AIR®, Microsoft® Silverlight and NETFLIX video applications. Feature plug-in components 210 may be standalone applications implemented as binary executables or scripts.

In some embodiments, the server application 212 may serve an asynchronous JavaScript and XML (AJAX) based HTML/JavaScript web page to wrap the input and output data to the web based client application 204. The web based client application 204 may be an HTML/JavaScript aware client application.

Figure 3:
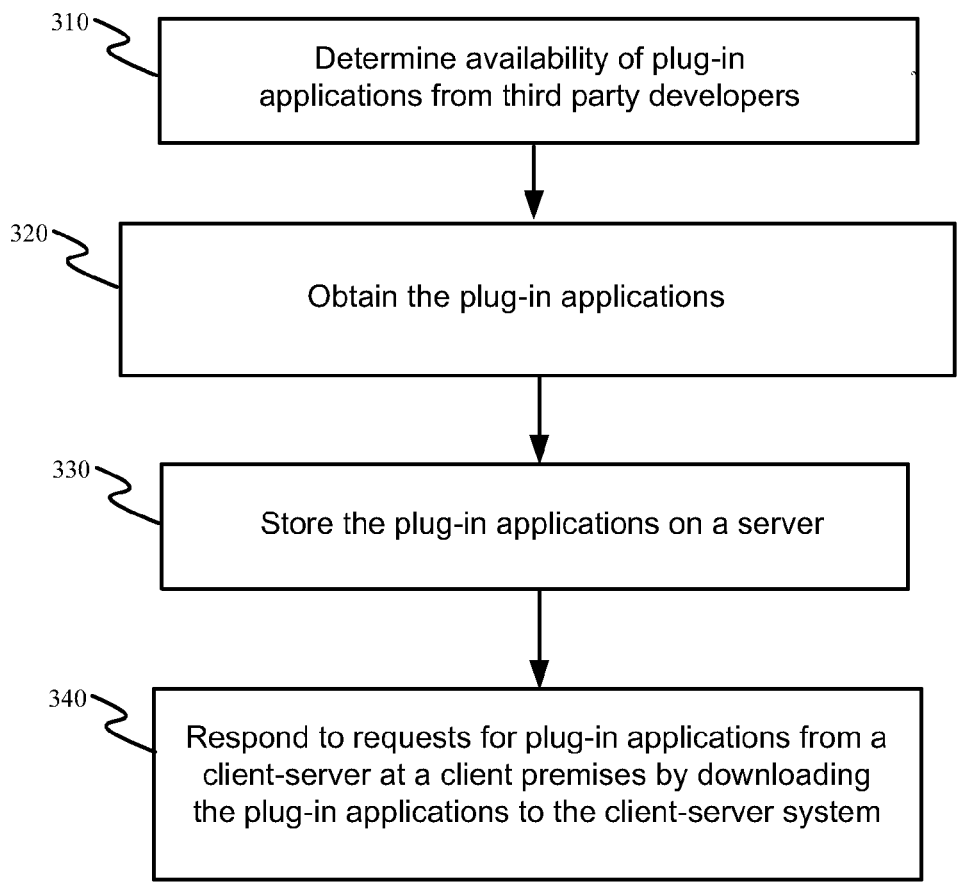
FIG. 3 illustrates a flowchart of operations of one exemplary embodiment consistent with the present disclosure.

FIG. 3 illustrates a flowchart 300 of operations of one exemplary embodiment consistent with the present disclosure. At operation 310, the availability of plug-in applications from third party developers is determined. At operation 320, the plug-in applications are obtained from the third party developers. They may be downloaded over the internet. At operation 330, the downloaded plug-in applications are stored on a server. At operation 340, in response to requests for plug-in applications from a client server at a client premises, the requested plug-in applications are downloaded to the client-server system. The request from the client-server system may be for new plug-ins or for updates to existing plug-ins.

Figure 4:
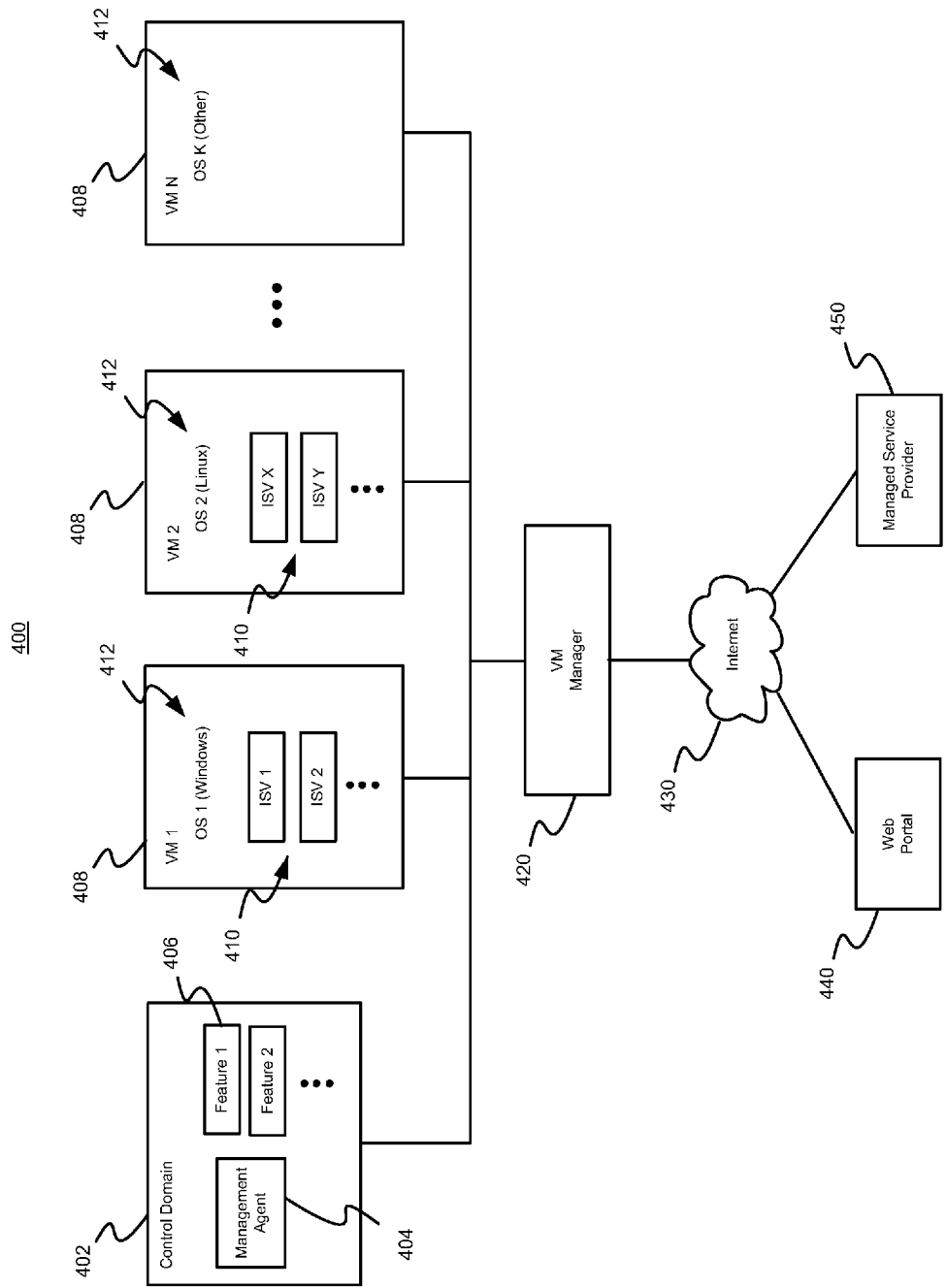
FIG. 4 illustrates a block diagram of another exemplary embodiment consistent with the present disclosure.

FIG. 4 illustrates a block diagram 400 of another exemplary embodiment consistent with the present disclosure. The embodiment may be implemented as a system which is hosted, in part, on a platform comprising a control domain 402, one or more virtual machines (VMs) 408, and a VM manager 420. In some embodiments, a virtual machine may be a real machine, including processor and memory for example, or may be a software implementation that emulates a machine. The virtual machine may include one or more isolated guest operating systems installed within a host operating system. The platform may further comprise processors (CPUs), memory, storage, network ports, user interfaces and other suitable components which are not illustrated for simplicity. The control domain 402 may host one or more features 406 which may be applications (apps) to perform certain functions or services. In some embodiments, features 406 may be provided, in whole or in part, by third party developers. Management agent 404 maintains features 406 by obtaining new features and updates to existing features as they become available. Management agent 404 also makes features 406 available to VMs 408 as needed.

VMs 408 provide workspaces for independent software vendors (ISVs) 410 to develop, configure and test software products and services. VMs 408 provide operational capabilities such as operating systems 412 which may include Windows, Linux or other suitable operating systems. VMs 408 may be individual real machines, partitions within real machines or any other suitable configuration of processing capability across a platform.

VM manager 420 integrates and/or supervises the control domain 402 and VMs 408. VM manager 420 may also provide access to the internet 430. VM manager 420 may also be configured with a trusted boot capability as part of a secure operating environment. The trusted boot capability can verify that unauthorized modifications to the system have not occurred. VM manager 420 may also communicate with web portal 440 over internet 430. Web portal 440 may be configured to direct users to the system. VM manager 420 may also communicate with managed service providers (MSPs) 450 that interact with the system over internet 430.

Figure 5:
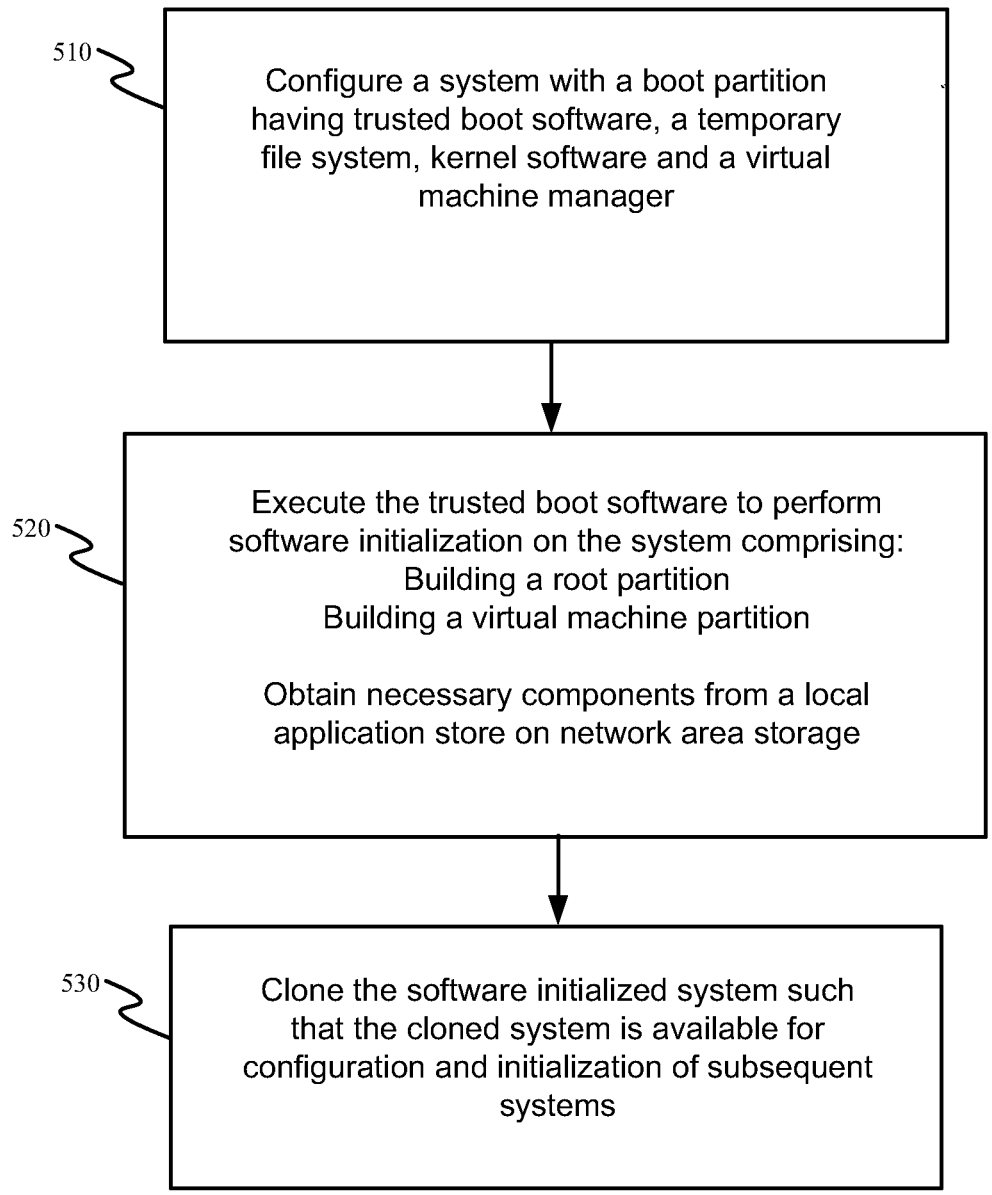
FIG. 5 illustrates a flowchart of operations of another exemplary embodiment consistent with the present disclosure.

In one embodiment, a method is provided, through access to the VMs 408, for building and configuring systems at a factory with reduced user intervention. The systems may be matched to the underlying hardware platform through use of an appropriately configured VM 408. FIG. 5 illustrates a flowchart 500 of operations of an exemplary embodiment consistent with the present disclosure. At operation 510, a system is configured with a boot partition comprising trusted boot software (T-Boot), a temporary file system, kernel software and a virtual machine manager (VMM). At operation 520, the T-Boot is executed to perform software initialization on the system. The software initialization comprises building a root partition and building a virtual machine (VM) partition. The root partition build may include configuring an encrypted root file system and software stack. The VM partition build may include configuring an encrypted application and customer data storage repository. Components needed for the software initialization are obtained from a local application store on network area storage (NAS). At operation 530, the software initialized system is cloned so that it can be made available for configuration and initialization during subsequent system builds, contributing to improved efficiency for mass production.

In another embodiment of the present disclosure, there is provided a service model through which ISVs may access a provided workspace in which they develop, configure and test their software products and services. The workspace is an ISV factory which may be implemented in an environment such as the Intel® Hybrid Cloud product or other suitable cloud environment. The workspace may generally include a machine, in the cloud, that is configured with a requested operating system and any other desired capabilities, upon which the ISV may perform their setup, development and validation, including customer trials. This provides an alternative to the traditional model where an ISV builds their own development environment, obtains a local copy of a software development kit (SDK), builds and tests their product locally and then submits a final version to an app store for review.

Figure 6:
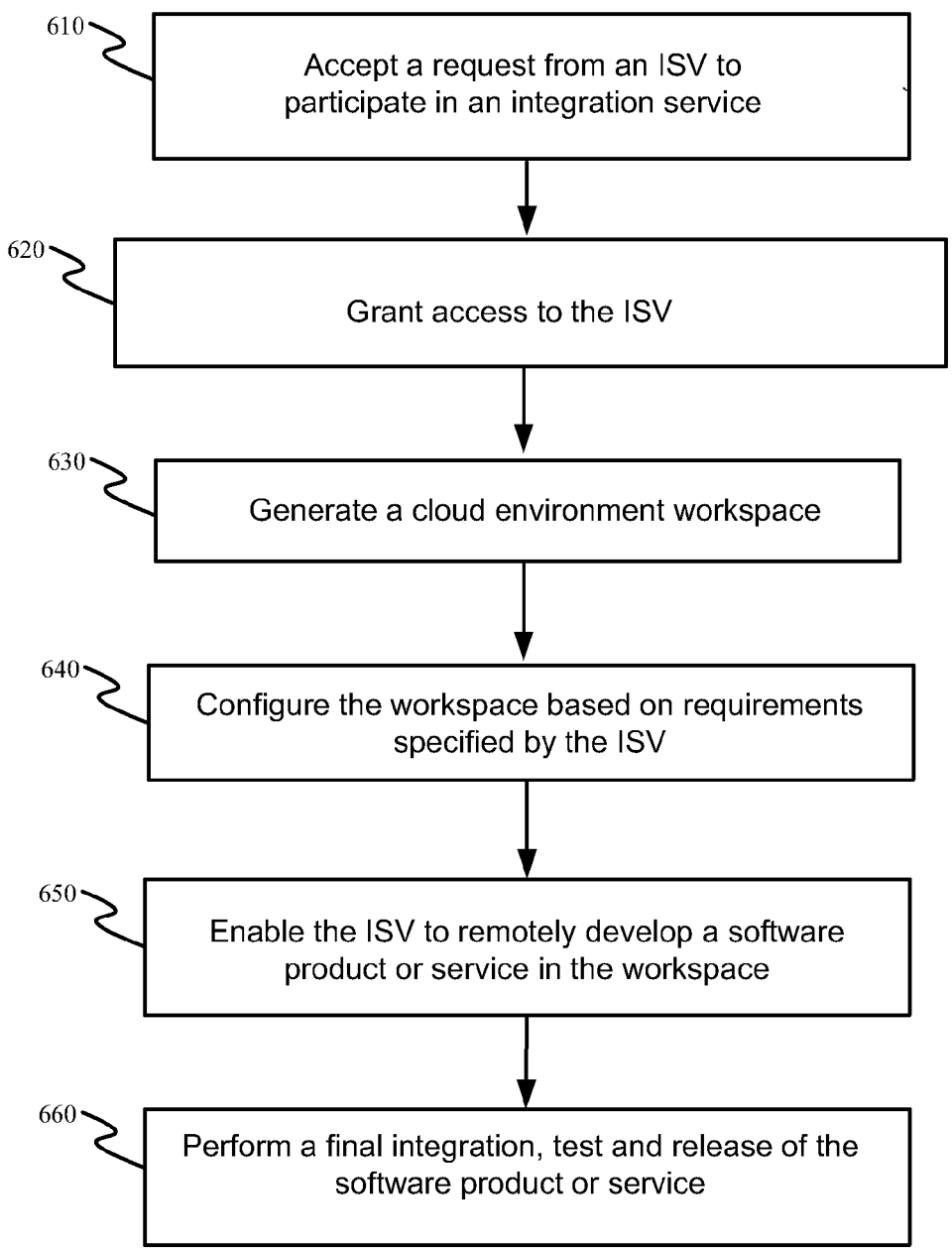
FIG. 6 illustrates a flowchart of operations of another exemplary embodiment consistent with the present disclosure.

FIG. 6 illustrates a flowchart 600 of operations of an exemplary embodiment consistent with the present disclosure. At operation 610, a request is accepted from an ISV to participate in an integration service. At operation 620, the ISV is granted access to participate, which may comprise a login capability. The decision to grant access may be based on an agreement, such as a non-disclosure agreement. The ISV may also, at this point, make decisions about price, deployment strategies and model or product configurations. At operation 630, a cloud environment workspace is generated. At operation 640, the workspace is configured based on requirements specified by the ISV. These requirements may include specifications regarding the hardware and/or operating systems of the workspace. The ISV may specify, for example, a particular operating system such as Windows or Linux. At operation 650, the ISV is enabled to remotely develop a software product or service in the workspace. At operation 660, a final integration, test and release of the software product or service is performed from the workspace. This process, or portions thereof, may be repeated as necessary to generate product updates including fixes and patches.

In another embodiment of the present disclosure, there is provided a method for dynamic deployment of software at a customer location. The customer is prompted for basic information (if any) that is needed for the installation and the process automatically installs the software in a working configuration, with license keys pulled from a remote portal and activated into the product.

Figure 7:
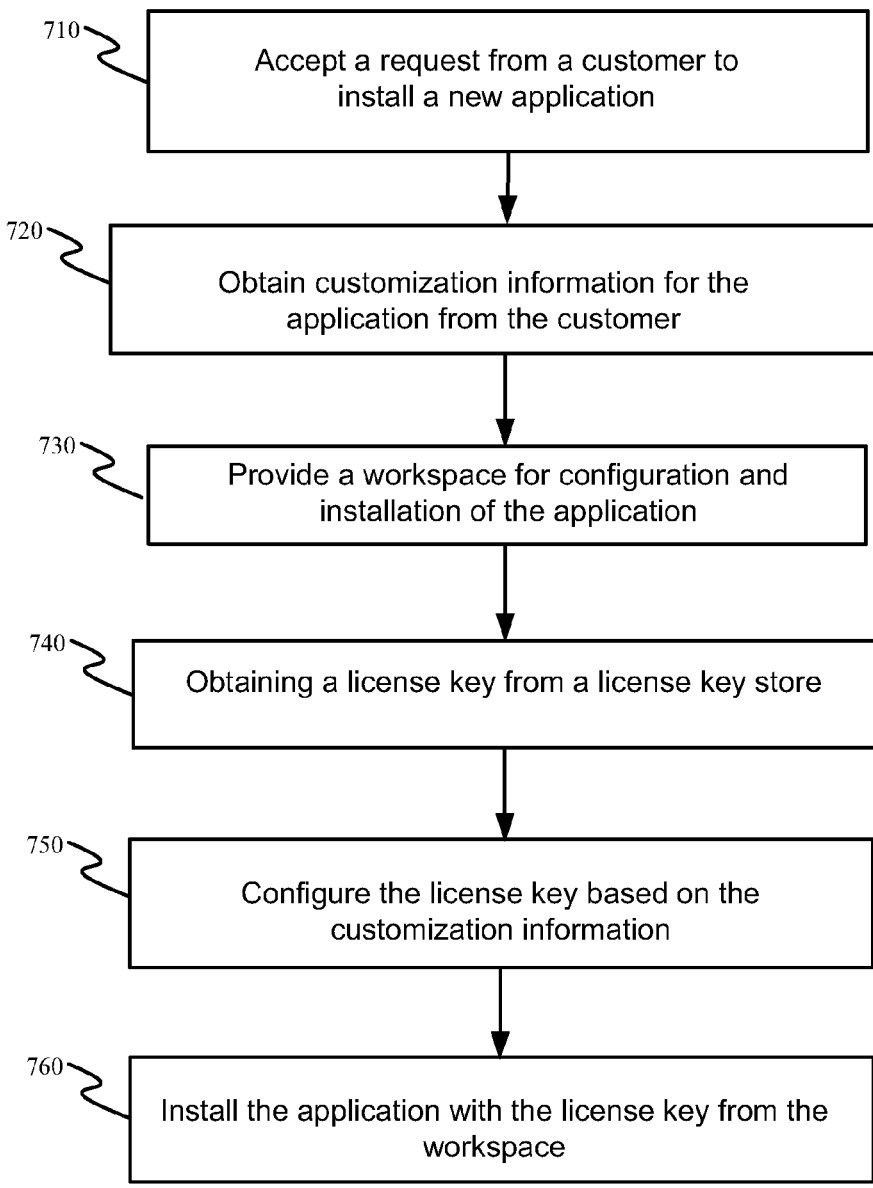
FIG. 7 illustrates a flowchart of operations of another exemplary embodiment consistent with the present disclosure.

FIG. 7 illustrates a flowchart 700 of operations of an exemplary embodiment consistent with the present disclosure. At operation 710, a request from a customer, to install a new application, is accepted. At operation 720, customization information for the application is obtained from the customer. This information may include requirements for features and options, information about the customer for licensing purposes, or any other information relevant to setup of the application. At operation 730, a workspace is provided for configuration and installation of the application. Any associated data structures, schema, or plug-ins for the application may also be provided to the workspace for the configuration and installation process. At operation 740, a license key is assigned from a license key store. At operation 750, the license key is configured based on the customization information. At operation 760, the application, along with the configured license key, is installed from the workspace to the customer location.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus the present disclosure provides methods and systems for dynamic feature enhancement in client server applications and for high volume server deployment with dynamic app store integration and further enable the delivery of a secure server in a pre-configured turnkey state through an automated process with increased efficiency tailored to mass production.

According to one aspect there is provided a system. The system may include a server application module configured to receive request packets from, and send response packets to, a web based client application, and the packets include input data, output data and control commands associated with a feature. The system of this example may also include a script engine module coupled to the server application module, the script engine module configured to identify a plug-in application on a remote server, download the plug-in application and execute the plug-in application under control of the server application module, and the plug-in application implements the feature.

Another example system includes the forgoing components and the feature implementation includes processing the input data and generating the output data in accordance with the control commands.

Another example system includes the forgoing components and the script engine module exposes an interface of the plug-in application to the web based client application.

Another example system includes the forgoing components and the server application module is an HTTP server application.

Another example system includes the forgoing components and the input data, the output data and the control commands are wrapped in HTML packets.

Another example system includes the forgoing components and the input data, the output data and the control commands are wrapped in XML packets.

According to another aspect there is provided a method. The method may include determining availability of plug-in applications from third party developers. The method of this example may also include obtaining the plug-in applications from the third party developers in response to the determining. The method of this example may further include storing the plug-in application on a server. The method of this example may further include responding to requests for the plug-in applications from a client-server system at a client premises by downloading the plug-in applications to the client-server system.

According to another aspect there is provided a method. The method may include configuring a system with a boot partition including T-Boot software, a temporary file system, kernel software and a VMM. The method of this example may also include executing the T-Boot to perform software initialization on the system, and the software initialization includes building a root partition and building a VM partition, and components needed for the software initialization are obtained from a local application store on NAS. The method of this example may further include cloning the software initialized system, and the cloned system is available for configuration and initialization of subsequent systems.

Another example method includes the forgoing operations and the root partition building includes configuring an encrypted root file system and software stack.

Another example method includes the forgoing operations and the VM partition building includes configuring encrypted application and customer data storage.

According to another aspect there is provided a method. The method may include accepting a request from an ISV, the request to participate in an integration service. The method of this example may also include granting access to the ISV in response to the request. The method of this example may further include generating a cloud environment workspace. The method of this example may further include configuring the workspace based on requirements specified by the ISV. The method of this example may further include enabling the ISV to remotely develop a software product or service in the workspace. The method of this example may further include performing a final integration, test and release of the software product or service in the workspace.

Another example method includes the forgoing operations and the granting is based on reaching an agreement with the ISV.

Another example method includes the forgoing operations and the remote development further includes testing and configuring the software product or service.

According to another aspect there is provided a method. The method may include accepting a request from a customer, the request to install a new application. The method of this example may also include obtaining application customization information from the customer. The method of this example may further include providing a workspace for configuration and installation of the application. The method of this example may further include obtaining a license key from a license key store. The method of this example may further include configuring the license key based on the application customization information. The method of this example may further include installing the application with the configured license key from the workspace.

Another example method includes the forgoing operations and further includes supplying data structures and plug-ins associated with the application to the workspace.

According to another aspect there is provided at least one computer-readable storage medium having instructions stored thereon which when executed by a processor, cause the processor to perform the methods as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for configuring a system, comprising:
receiving, at a system comprising at least a processor and memory, a configuration causing said processor to configure a boot partition in said memory, said boot partition including trusted boot software (T-Boot), a temporary file system, kernel software and a virtual machine manager (VMM);
executing, using at least said processor, said T-Boot to perform software initialization on said system, wherein said software initialization comprises building a root partition and building a virtual machine (VM) partition, and wherein components needed for said software initialization are obtained from a local application store on network area storage (NAS); and
cloning, using at least said processor, said software initialized system, wherein said cloned system is available for configuration and initialization of subsequent systems.

2. The method of claim 1, wherein building said root partition comprises configuring an encrypted root file system and software stack.

3. The method of claim 1, wherein building said VM partition comprises configuring encrypted application and customer data storage.

4. The method of claim 1, wherein said VMM has trusted boot capability, and the method further comprises verifying that unauthorized modifications to said system have not occurred at least in part with said trusted boot capability.

5. The method of claim 1, further comprising communicating, with said VMM, with a web portal, wherein said communicating causes said web portal to direct one or more users to the system.

6. At least one computer readable storage device comprising instructions for configuring a system which when executed by a processor cause the processor to perform the following operations comprising:
receiving, at a system with comprising at least said processor and memory, a configuration causing said processor to configure a boot partition in said memory, said boot partition including trusted boot software (T-Boot), a temporary file system, kernel software and a virtual machine manager (VMM);
executing, using at least said processor, said T-Boot to perform software initialization on said system, wherein said software initialization comprises building a root partition and building a virtual machine (VM) partition, and wherein components needed for said software initialization are obtained from a local application store on network area storage (NAS); and
cloning, using at least said processor, said software initialized system, wherein said cloned system is available for configuration and initialization of subsequent systems.

7. The at least one computer readable storage device of claim 6, wherein building said root partition comprises configuring an encrypted root file system and software stack.

8. The at least one computer readable storage device of claim 6, wherein building said VM partition comprises configuring encrypted application and customer data storage.

9. The at least one computer readable storage device of claim 6, wherein said VMM has trusted boot capability, and said instructions when executed further cause said processor to verify that unauthorized modifications to said system have not occurred at least in part with said trusted boot capability.

10. The at least one computer readable storage device of claim 6, wherein said instructions when executed further cause said processor to cause said VMM to communicate with a web portal so as to cause said web portal to direct one or more users to the system.

\* \* \* \* \*